United States Patent [19]

Shimoyoshi et al.

[11] Patent Number: 5,461,378
[45] Date of Patent: Oct. 24, 1995

[54] DIGITAL SIGNAL DECODING APPARATUS

[75] Inventors: Osamu Shimoyoshi; Kenzo Akagiri; Miki Abe, all of Kanagawa; Takahiro Watanabe, Tokyo, all of Japan

[73] Assignee: Sony Corporation, Tokyo, Japan

[21] Appl. No.: 118,456

[22] Filed: Sep. 8, 1993

[30] Foreign Application Priority Data

Sep. 11, 1992 [JP] Japan .................................. 4-243574

[51] Int. Cl.⁶ ............................................ H03M 7/30
[52] U.S. Cl. ......................................... 341/51; 395/2.13
[58] Field of Search ..................... 341/50, 51; 395/2.13, 395/2.37

[56] References Cited

U.S. PATENT DOCUMENTS

| | | | |
|---|---|---|---|
| 4,002,841 | 1/1977 | Ching et al. | 179/15 AS |
| 4,184,049 | 1/1980 | Crochiere et al. | 179/1 |
| 4,455,649 | 6/1984 | Esteban et al. | 370/80 |
| 4,516,241 | 5/1985 | Farah et al. | 370/110.1 |
| 4,535,472 | 8/1985 | Tomcik | 381/31 |
| 4,573,187 | 2/1986 | Bui et al. | 381/43 |
| 4,870,685 | 9/1989 | Kadokawa et al. | 381/31 |
| 4,872,132 | 10/1989 | Retter | 364/748 |
| 4,885,790 | 12/1989 | McAulaly et al. | 381/36 |
| 4,896,362 | 1/1990 | Veldhuis et al. | 381/30 |
| 4,932,062 | 6/1990 | Hamilton | 381/43 |
| 4,972,484 | 11/1990 | Theile et al. | 381/37 |
| 4,991,213 | 2/1991 | Wilson | 381/34 |
| 5,049,992 | 9/1991 | Citta et al. | 358/140 |
| 5,109,417 | 4/1992 | Fielder et al. | 381/36 |
| 5,115,240 | 5/1992 | Fujiwara et al. | 341/51 |
| 5,117,228 | 5/1992 | Fuchigami et al. | 341/200 |
| 5,134,475 | 7/1992 | Johnston et al. | 358/133 |
| 5,142,656 | 8/1992 | Fielder et al. | 381/37 |

(List continued on next page.)

FOREIGN PATENT DOCUMENTS

| | | | |
|---|---|---|---|
| 0145788A1 | 6/1985 | European Pat. Off. | G11B 20/10 |
| 0255111A2 | 2/1988 | European Pat. Off. | G11B 20/10 |
| 0409248A2 | 1/1991 | European Pat. Off. | H03M 7/30 |
| 0423050A1 | 4/1991 | European Pat. Off. | H04B 1/66 |
| 0420745A2 | 4/1991 | European Pat. Off. | H04B 1/66 |
| 0473367A1 | 3/1992 | European Pat. Off. | H03M 7/30 |
| 0506394A2 | 9/1992 | European Pat. Off. | G10L 7/00 |
| 0525809A2 | 2/1993 | European Pat. Off. | H04B 1/66 |
| 0554081A1 | 8/1993 | European Pat. Off. | G11B 20/10 |

OTHER PUBLICATIONS

Brandenburg et al., "Aspec: Adaptive Spectral Entropy Coding of High Quality Music Signals," Audio Engineering Society Preprint No. 3011 (1991 Feb.).

Davidson et al., "Low Complexity Transform Coder for Satellite Link Applications": Audio Engineering Society Preprint No. 2966 (1990 Sep.).

Esteban et al., "Application of Quadrature Mirror Filters To Split Band Voice Coding Schemes," Record of the 1977 UCASSP, pp. 191–195 (1977 May.

(List continued on next page.)

Primary Examiner—Howard L. Williams
Attorney, Agent, or Firm—Limbach & Limbach; Charles P. Sammut

[57] ABSTRACT

There is provided a decoding apparatus adapted for decoding a coded signal from a coding apparatus adapted to divide an input, digital signal into signals in frequency bands by using at least one filter to divide respective filter outputs into blocks every plural words to carry out a first block floating processing every respective blocks to further implement an orthogonal transform processing to the signal which has been subjected to the first block floating processing to thereby conduct frequency analysis thereafter to divide the orthogonally transformed output into blocks every plural words to carry out a second block floating processing every respective blocks, wherein after the second block floating is released by using a predetermined number of inverse floating circuits, the coded signal is restored to a signal on the time base by inverse orthogonal transform processing at a predetermined number of IMDCT circuits, and the first block floating is released in the process of the inverse orthogonal transform operation.

36 Claims, 10 Drawing Sheets

U.S. PATENT DOCUMENTS

| | | | |
|---|---|---|---|
| 5,151,941 | 9/1992 | Nishiguchi et al. | 381/46 |
| 5,157,760 | 10/1992 | Akagiri | 395/2 |
| 5,166,686 | 11/1992 | Sugiyama | 341/51 |
| 5,166,686 | 11/1992 | Sugiyama | 341/155 |
| 5,199,078 | 3/1993 | Orglmeister | 381/47 |
| 5,214,741 | 5/1993 | Akamine et al. | 395/2.12 |
| 5,231,484 | 7/1993 | Gonzales et al. | 358/133 |
| 5,301,205 | 4/1994 | Tsutsui et al. | 375/1 |

OTHER PUBLICATIONS

Johnston, "Transform Coding of Audio Signals Using Perceptual Noise Criteria," 6 IEEE Trans. on Selected Areas in Communications, 314–323 (1988 Feb.).

Rothweiler, "Polyphase Quadrature Filters–A New Subband Coding Technique," 3 Proc. 1983 ICASSP 1280–1283 (1983 Apr.).

Schroeder et al., "High Quality Digital Audio Encoding with 3.0 Bits/Sample Using Adaptive Transform Coding," Audio Engineering Society Reprint No. 2321 (1986 Mar.).

Stoll et al., "Masking–Pattern Adapted Sub–Band Coding: Use of the Dynamic Bit–Rate Margin," Engineering Society Preprint No. 2585 (1988 Mar.).

Theile et al., "Low Bit–Rate Coding of High Quality Audio Signals—An Introduction to MASCAM System," 230 EBU Technical Review 71–93 (1988 Aug.).

Y. Mahieux & J. P. Petit, "Transform Coding of Audio Signals at 64 KBIT/S," Globecom 90, vol. 1, pp. 518–522 (Dec. 1990).

ICASSP '89 vol. 3, May 1989, NY, USA pp. 1993–1996, XP000089272 Johnston 'Perceptual Transform Coding of Wideband Stereo Signals' * p. 1; FIG. 2 *.

ISEE Journal on Selected Areas in Communication vol. 10, No. 5, Jun. 1992, New York US pates 796–818, XP0000274716 Jayant 'Signal Compression; Technology Targets and Research Directions' * p. 806, right column, line 36; FIG. 11C *.

DIGITAL SIGNAL DECODING APPARATUS

BACKGROUND OF THE INVENTION

1. Field of the Invention

This invention relates to a digital signal decoding apparatus adapted for decoding a transmitted or reproduced signal (data) obtained after a signal coded by an efficient coding apparatus for efficiently coding input digital data by the so-called block floating processing is transmitted or recorded.

2. Description of the Prior Art

There has been conventionally known an efficient coding technology to orthogonally transform an audio signal, etc. to divide its orthogonally transformed output into blocks every plural words to carry out floating processing every respective blocks to implement quantization thereto to record on a medium, or transmit thereto, floating information and quantization information along with a quantized output. Here, the above-mentioned block floating technique is basically directed to a technique to multiply respective words within the block by a value common thereto so that they have larger values, thus to improve the accuracy at the time of quantization. For an actual example, there is a block floating technique to search for the maximum one of absolute values (i.e., maximum absolute value) of respective words within the block to implement floating processing to all words within the block by using a floating coefficient common thereto, so that the maximum absolute value is not saturated. For a simpler block floating technique, there is also a block floating technique with 6 dB being as a unit utilizing bit shift.

However, in conventional orthogonal transform processing, without use of the block floating technique, a sufficient accuracy is ensured even at the time of any input, and an operation word length is made long to such a sufficient degree that the word length accuracy of a signal inputted to an orthogonal transform circuit is not damaged by the orthogonal transform processing. Further, an approach is employed to allow the block size for the orthogonal transform processing to be variable depending upon the property in point of time of a signal, thus to improve the analysis accuracy. There are instances where, as an index for judgment therefor, root mean square values of differences between adjacent samples of a signal are used.

Meanwhile, in such orthogonal transform processing, in order to perform an operation while maintaining the accuracy of an input, the operation word length becomes longer. For this reason, the scale of the hardware becomes large, resulting in great difficulty from an economical point of view. Further, in the case where the block size for the orthogonal transform processing is caused to be variable, newly determining a judgment index therefor only for the purpose results in an increase in the number of operation steps.

Further, in order to search for the above-described maximum absolute value in the above-mentioned block floating processing, such a procedure is required to judge whether or not the absolute value of the present (current) word is larger than the maximum absolute value of past words with respect to all words within one block. As a result, the number of steps in the processing program becomes large and it, takes much time therefor.

In view of the above, the applicant of this invention has already proposed, in the specification of the Japanese Patent Application No. 235613/1991 and the drawings attached therewith, an efficient coding technique to orthogonally transform an audio signal, etc. to divide the orthogonally transformed output, into blocks every plural words to carry out floating processing every respective blocks to implement quantization thereto to record floating information and quantization information along with a quantized output onto a medium, or transmit such information thereto wherein an approach is employed to carry out a first block floating processing before the orthhogonal transform processing, and to carry out a second block floating processing after the orthogonal transform processing to thereby prevent degradation in the operation accuracy during the execution of the orthogonal transform operation. This technique which has been already proposed in the specification and the drawings mentioned above is directed to the technique to multiply respective words within a unit to carry out the orthogonal transform processing (orthogonal transform block) by a coefficient common thereto, thus to improve the accuracy at the time of the orthogonal transform processing. As a simpler method, a block floating with 6 dB being as a unit utilizing bit shift is frequently used.

Meanwhile, in the inverse orthogonal transform processing for decoding corresponding to the orthogonal transform processing in the above-mentioned efficient coding, when an attempt is made to implement inverse orthogonal transform processing to words which have been subjected to floating before inputting to the orthogonal transform circuit while maintaining its floating state, there results a high possibility that an overflow may take place in the process of the operation.

In order to prevent such overflow, however, when small floating coefficients are used to carry out floating, there results degrated operation accuracy.

OBJECT AND SUMMARY OF THE INVENTION

This invention has been proposed in view of actual circumstances as described above, and its object is to provide a digital signal decoding apparatus capable of carrying out, with a small scale of the hardware and a lesser operation quantity, inverse orthogonal transform operation processing used in decoding corresponding to the orthogonal transform processing in the efficient coding processing.

To achieve the above-mentioned object, in accordance with this invention, there is provided a digital signal decoding apparatus adapted to decode a coded signal from a digital signal coding apparatus, adapted to divide an input digital signal into signals in frequency bands by using at least one filter to divide respective filter outputs into blocks every plural words to carry out a first block floating processing every respective blocks to further implement an orthogonal transform processing to the signal which has been subjected to the first block floating processing to thereby conduct frequency analysis to divide the orthogonally transformed output into blocks every plural words to carry out a second block floating processing and a quantization processing every respective blocks, wherein after the second block floating is released, an inverse orthogonal transform processing is implemented to the coded signal to thereby conduct frequency synthesis to restore it to a signal on the time base, and the first block floating is released in the process of the inverse orthogonal transform operation.

In the digital signal decoding apparatus thus featured, scale down is repeatedly carried out in the process of the inverse orthogonal transform operation to thereby release the first block floating. At this time, scale down in the process of the inverse orthogonal transform operation is reversibly carried out. Further, the number of scale down times (operations) in the process of the inverse orthogonal transform operation is determined on the basis of the first block floating quantity. In this way, scale down is implemented in the process of the inverse orthogonal transform operation to thereby prevent overflow in the process of the operation.

In a coding apparatus corresponding to the digital signal decoding apparatus featured above, the above-mentioned band division by filter is such that as the frequency shifts to a lower frequency band, the frequency band width is caused to be broad. This band division by filter may be realized by cascade-connecting filters for dividing the frequency band into two frequency bands.

Further, in the digital signal decoding apparatus thus featured, the above-mentioned inverse orthogonal transform processing is an Inverse Modified Discrete Cosine Transform processing, and the above-mentioned inverse orthogonal transform processing is carried out at a variable block size.

Namely, the digital signal decoding apparatus of this invention is adapted to implement inverse orthogonal transform processing to words in which the second block floating is released to release the first block floating to be released at the inverse orthogonally transformed output by scale down in the process of the inverse orthogonal transform operation, and to reasonably repeatedly implement that scale down at the releasing operation of the first block floating to prevent an overflow in the process of the inverse orthogonal transform operation, thereby to contemplate solving the above-mentioned problems.

While the above-mentioned digital signal decoding apparatus is directed to an apparatus in which the band division coding and the orthogonal transform coding are taken into consideration, this invention may be applied, in the same manner as above, to an apparatus such as a Digital Compact Cassette (DCC) in which only the orthogonal transform coding is taken into consideration.

In accordance with this invention, the number of scale down times (operations) is determined on the basis of a first block floating quantity to repeatedly carry out scale down operations of the determined number of times in the process of the inverse orthogonal transform operation, thus making it possible to reduce the inverse orthogonal transform operation accuracy to a reasonable degree from a viewpoint of the entirety of efficient decoding, and to prevent an overflow at the time of the operation processing for the inverse orthogonal transform processing.

DESCRIPTION OF THE PREFERRED EMBODIMENT

A preferred embodiment of this invention will now be described with reference to the attached drawings.

By taking into consideration the flow of the following description, prior to the description of a digital signal decoding apparatus of the embodiment of this invention, a digital signal coding apparatus (efficient coding apparatus) corresponding to the digital signal decoding apparatus of this embodiment will be first described. The digital signal decoding apparatus of this embodiment will be described following the description of the above-mentioned efficient coding apparatus.

The technology for implementing efficient coding to a digital signal by using the technique of the adaptive transform coding (ATC), the technique in which the sideband coding (SBC) and the adaptive transform coding (ATC) are combined, and the technique of the adaptive bit allocation (APC-AB) will now be described with reference to FIG. 1 and figures subsequent thereto.

Figure 1:
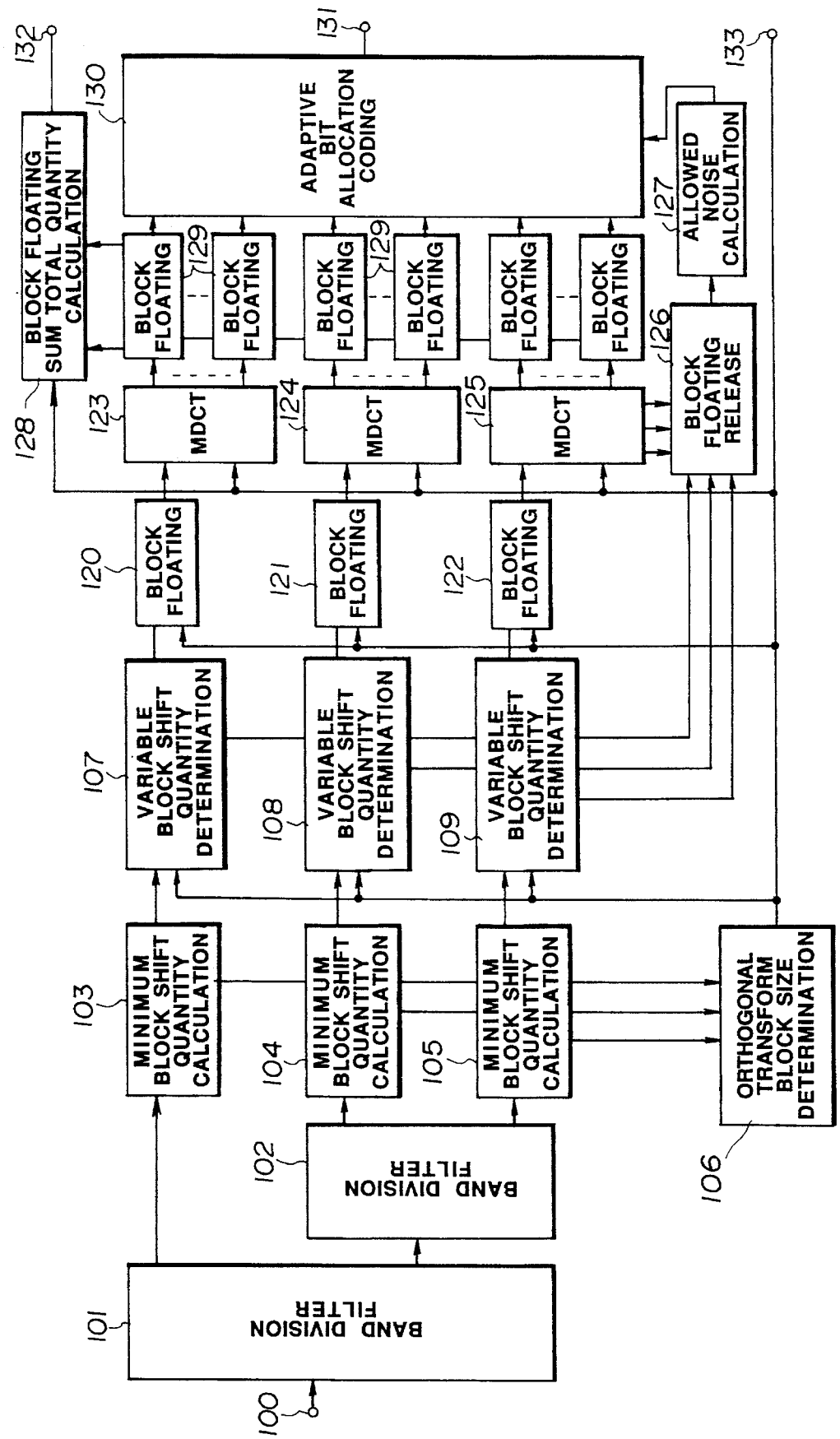
FIG. 1 is a circuit diagram showing, in a block form a digital signal coding apparatus corresponding to a digital signal decoding apparatus of this invention.

In an actual efficient coding apparatus shown in FIG. 1, such an approach is employed to divide an input digital signal into signals (signal components) in a plurality of frequency bands by using filters, etc., and to make a selection such that according as the frequency shifts to a higher frequency band, the band width is caused to be broad to carry out orthogonal transform processing every respective frequency bands to adaptively bit-allocate spectrum data on the frequency base thus obtained every so called critical bands in which the hearing sense characteristic of the human being is taken into consideration (which will be described later), or every plural bands obtained by further dividing the critical band in a higher frequency band to encode them. It is of course that the widths of frequency bands divided by using filters may be equal to each other. In the embodiment of this invention, an approach is employed to adaptively vary the orthogonal transform block size (block length) in dependency upon an input signal before the orthogonal transform processing, and to carry out the floating processing every block.

Namely, in FIG. 1, an input terminal 100 is supplied with, e.g., an audio PCM signal of 0~20 kHz. This input signal is divided into signals (signal components) in the frequency band of 0~10 kHz and the frequency band of 10~20 kHz by using a band division filter 101, e.g., so called a QMF filter, etc., and the signal in the frequency band of 0~10 kHz is further divided into a signal in the frequency band of 0~5 kHz and a signal in the frequency band of 5~10 kHz by using a band division filter 102 such as so called a QMF filter, etc.

in a manner similar to the above. As the above-described filter, there is, e.g., a QMF filter, which is described in R. E. Crochiere, Digital coding of speech in subbands, Bell Syst. Tech. J. Vol . 55, No. 8, 1976. Further, a band division technique by equal band width filters is described in ICASSP 83, BOSTON, Polyphase Quadrature filters-A new subband coding technique, Joseph H. Rothweiler.

The signal in the frequency band of 10 k~20 kHz from the band division filter 101 first undergoes a processing such that the absolute values of samples are taken at blocks every 2.5 ms. The absolute values thus obtained are processed at a minimum block shift quantity calculation circuit 103 for obtaining (calculating) logical sums thereof. Then, an orthogonal transform block size determined at an orthogonal transform block size determination circuit 106 is used to calculate a shift quantity at that size by a variable block shift quantity determination circuit 107. To realize this, outputs of the minimum block shift quantity calculation circuit 103 every 2.5 ms are compared with each other at the determined orthogonal transform block size to select the minimum output. By using an output thus obtained from the variable block shift quantity determination circuit 107, a first block floating circuit 120 implements block floating to an output (the signal in the frequency band of 10 k~20 kHz) from the band division filter 101. The output which has been subjected to block floating at the first block floating circuit 120 is sent to a Modified Discrete Cosine Transform (MDCT) Circuit 123 which is an example of the orthogonal transform circuit, at which such output is subjected to MDCT processing.

Similarly, the signal in the frequency band of 5 k~10 kHz from the band division filter 102 first undergoes a processing such that the absolute values of samples are taken at blocks every 2.5 ms. The absolute values thus obtained are processed at a minimum block shift quantity calculation circuit 104 for obtaining (calculating) logical sum thereof. Then, an orthogonal transform block size determined at the orthogonal transform block size determination circuit 106 is used to calculate a shift quantity at that size by a variable block shift quantity determination circuit 108. To realize this, outputs of the minimum block shift quantity calculation circuit 104 every 2.5 ms are compared with each other at the determined orthogonal transform block size to select the minimum output. By using an output thus obtained from the variable block shift quantity determination circuit 108, a first block floating circuit 121 implements block floating to an output (the signal in the frequency band of 5 k~10 kHz) from the band division filter 102. The output thus processed is sent to a MDCT circuit 124, at which such output is subjected to MDCT processing.

In addition, similarly, the signal in the frequency band of 0–5 kHz from the band division filter 102 undergoes a processing such that the absolute values of samples are taken at blocks every 2.5 ms. The absolute values thus obtained are processed at a minimum block shift quantity calculation circuit 105 for obtaining (calculating) logical sums thereof. Then, a shift quantity at an orthogonal transform block size determined by the orthogonal transform block size determination circuit 106 is used to calculate a shift quantity at that size by a variable block shift quantity determination circuit 109. To realize this, outputs of the minimum block shift quantity calculation circuit 105 every 2.5 ms are compared with each other at the orthogonal transform block size to select the minimum output. By using an output thus obtained from the variable block shift quantity determination circuit 109, a first block floating circuit 122 implements block floating to an output (the signal in the frequency band of 0–5 kHz) from the band division filter 102. The output thus processed is sent to a MDCT circuit 125, at which such output is subjected to MDCT processing.

The above-mentioned MDCT (Modified Discrete Cosine Transform) is described in, e.g., ICASSP 1987 Subband/Transform Coding Using Filter Bank Designs Based on Time Domain Aliasing Cancellation, J. P. Princen, A. B. Bradley, Univ. of Surrey Royal Melbourne Inst. of Tech.

Figure 2:
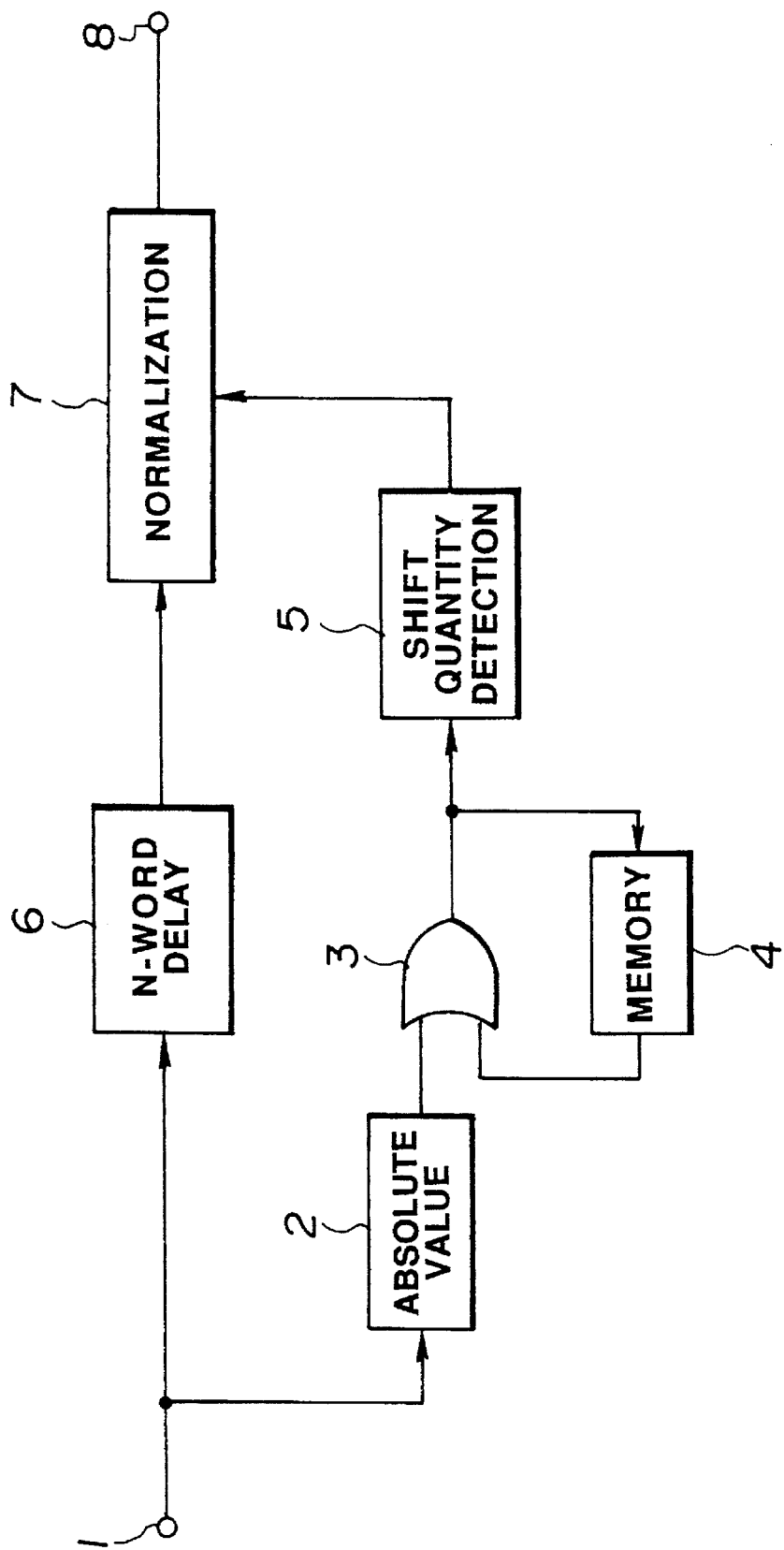
FIG. 2 is a circuit diagram showing, in a block form, an actual circuit configuration for carrying out the block floating operation in the apparatus shown in FIG. 1.

The block floating operation will now be described with reference to FIG. 2. An input terminal 1 is supplied with each of digital signals outputted from filters 101, 102 of FIG. 1. This digital signal is sent to an absolute value calculation circuit 2, at which absolute values of respective words are calculated. The absolute values thus calculated are sent to a logical sum (OR) circuit 3 for determining floating coefficients. The logical sum output data from the OR circuit 3 is sent to a memory 4 for storing one word as a latch or register. The output data from the memory 4 is fed back to the OR circuit 3, at which an operation for logical sum of that output data and an absolute value of a present word from the absolute value calculation circuit 2 is performed. Namely, logical sum of a logical sum operation output from the OR circuit 3 and a present word, which has been delayed by one word at the memory 4 and inputted to the OR circuit 3, is taken, whereby logical sums of respective words are to be accumulatively taken in sequence. The memory 4 is reset (cleared to zero) every time data of N words of one block is inputted. As a result, logical sums of the entirety of respective absolute values of N words of one block are to be performed.

Logical sum output data from the OR circuit 3 is sent to a shift quantity detecting circuit 5. This shift quantity detecting circuit 5 detects the number of digits until "1" appears for the first time when respective bits are viewed from the Most Significant Bit (MSB) to the lower order, or a shift quantity immediately before "1" appears for the first time at the Most Significant Bits (MSB) when logical sum output data is left-shifted. Namely, for values of respective digits of a logical sum output of absolute values of respective words within one block, the values of the digits where "1" is set in any word take "1" and only the values of the digits where "0" are set in each word take "0". For this reason, the digit where "0"s are set in succession from the MSB of the logical sum output indicates "0" in each word. This implies that the number of significant digits (the number of digits where "0" is neglected from the MSB) is equal to the number of significant digits of the maximum absolute value within a block, Accordingly, the above-mentioned shift quantity becomes equal to a shift quantity based on the maximum absolute value within the block.

Further, the digital signal from the input terminal 1 is also sent to a normalization (shift or floating) circuit 7 through an N word delay circuit 6 for time matching of the floating processing, and shift quantity information from the shift quantity detecting circuit 5 is also sent to the normalization circuit 7. This normalization circuit 7 left-shifts, by the detected shift quantity, respective inputted data of N words of one block to thereby carry out normalization or floating processing. Thereafter, a fixed number of bits may be taken out from the higher order by using, e.g., a requantizer, etc. Data from the normalization circuit 7 is taken out from terminal 8.

Figure 3:
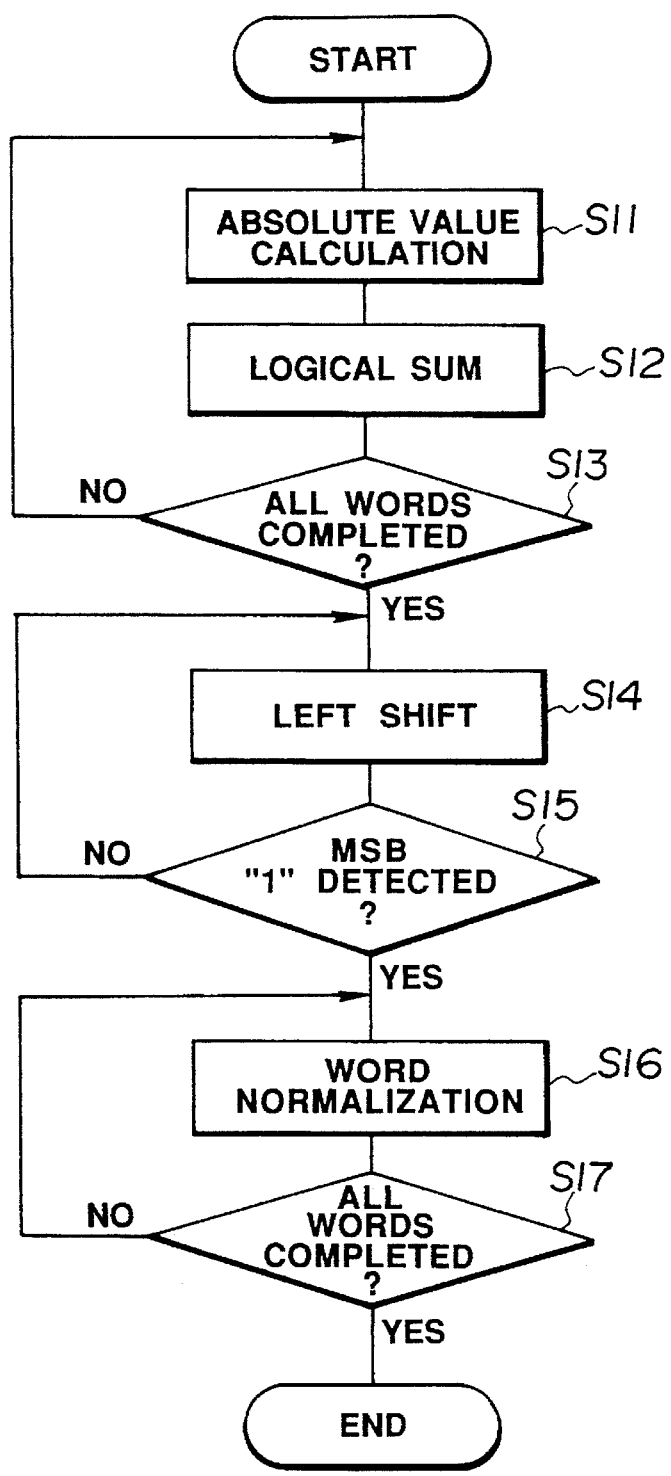
FIG. 3 is a flowchart for realizing, by software, the block floating operation of the circuit configuration shown in FIG. 2.

FIG. 3 is a flowchart showing the procedure in realizing the above-mentioned logical sum processing (block floating operation) by using software. At step S11 corresponding to the absolute value calculation circuit 2, absolute values of respective words are calculated. At the subsequent step S12, logical sum operation is performed similarly to the OR circuit 3. At the subsequent step S13, whether or not the logical sum operation of all words (N words) within one block is completed is discriminated. As a result, when it is discriminated that the logical sum operations of all words are not completed (NO), the processing returns to step S11. In contrast, when it is discriminated that the logical sum operations of all words are completed (YES), the processing proceeds to the subsequent step S14.

Steps S14 and S15 correspond to the operation at the shift quantity detecting circuit 5. At the step S14, left shift is carried out. At the step S15, whether or not it is detected that the Most Significant Bit (MSB) of the shifted result is "1" is discriminated. When "1" is not detected at MSB at the step S15 (NO), the processing returns to the step S14. In contrast, when "1" is detected at MSB at the step S15 (YES), the processing proceeds to the subsequent step S16. Steps S16, S17 correspond to the normalization circuit 7. At the step S16, respective words are normalized. At the step S17, whether or not N words within one block are all normalized is discriminated. As a result, when the discrimination result is NO, the processing returns to the step S16. In contrast, when the discrimination result is YES (normalization of all words is completed), the processing is completed.

In accordance with the above-mentioned embodiment, a complicated processing to detect the maximum absolute value within a block such as in the prior art becomes unnecessary, and simple processing to only take logical sums of absolute values within a block is carried out, thereby making it possible to determine floating coefficients, i.e., the above-mentioned shift quantities. This can lessen the number of steps in realizing, by using software such as a microprogram, the device for realizing a block floating operation, and permit the processing to be performed at a higher speed by reduction of the number of steps.

Figure 4:
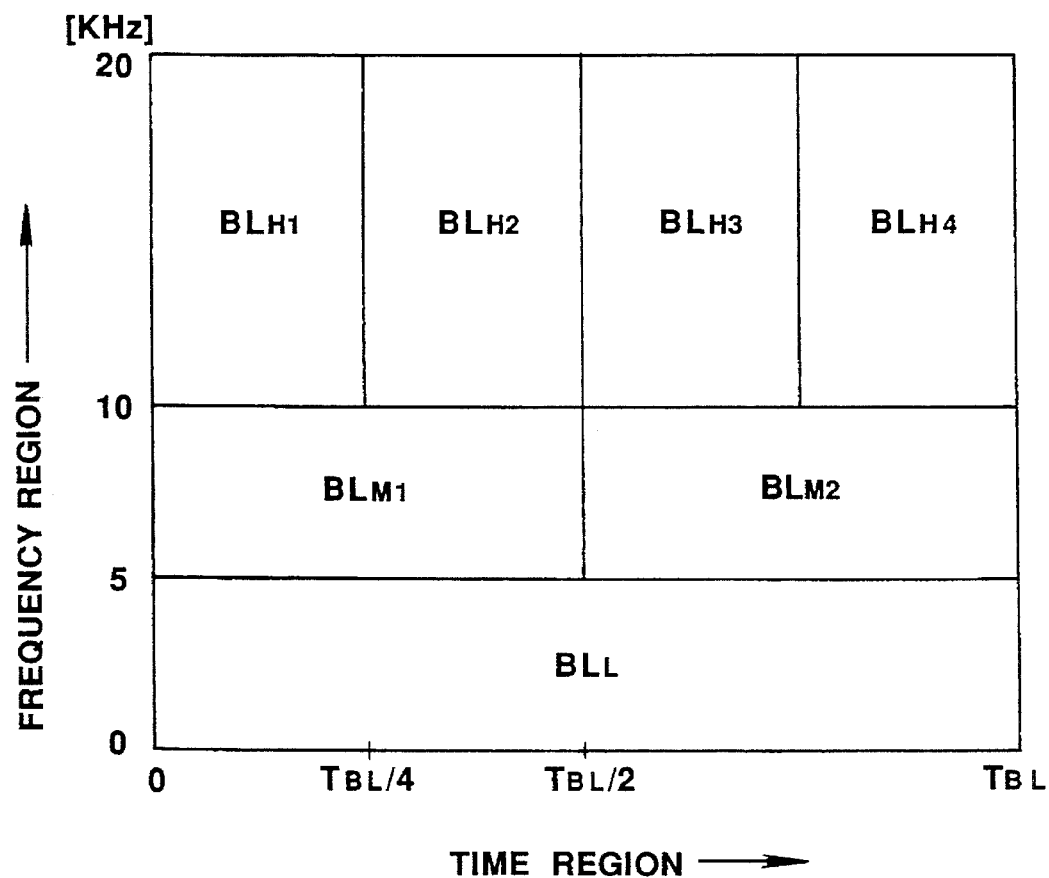
FIG. 4 is a view showing an actual example of division into blocks every respective divided frequency bands which extend in a frequency base direction and in a time base direction in the apparatus shown in FIG. 1.

Here, an actual example relating to a standard input signal with respect to blocks every respective bands supplied to respective MDCT circuits 123, 124, 125 of FIG. 1 is shown in FIG. 4. In the actual example of FIG. 4, as the frequency shifts to a higher frequency band, the frequency band width is caused to be broader, and the time resolution is enhanced to more degree (the block length becomes shorter). Namely, with respect to a signal in the frequency band of 0~5 kHz on a lower frequency band side, one block BLL is set to, e.g., 256 samples. With respect to a signal in the medium frequency band of 5 k~10 kHz, block configuration is realized by blocks BLM1, BLM2 each having a length TBL/2 which is one half of the length TBL of the block BLL on the lower frequency band side. In addition, with respect to a signal in the frequency band of 10 k~20 kHz on a higher frequency band side, block configuration is realized by blocks BLH1, BLH2, BLH3, BLH4 each having a length TBL/4 which is one forth of that of the block BLL on the lower frequency band side. It is to be noted that in the case where the frequency band of 0~22 kHz is taken into consideration as a frequency band of an input signal, the lower frequency band is 0~5.5 kHz, the medium frequency band is 5.5 k~11 kHz, and the higher frequency band is 11 k~22 kHz.

The operation of the orthogonal transform block size determination circuit 106 will now be described. Namely, this circuit 106 receives the number of shiftable bits every 2.5 ms from the minimum block shift quantity calculation circuits 103, 104, 105 to allow them to be in a bundle at 20 ms, whereby when there exists the portion where the number of shiftable bits decreases suddenly, e.g., by 4 bits or more, the circuit 106 considers that there has been a sudden increase of the amplitude of a signal, thus permitting the orthogonal transform block size to be reduced to one half or one fourth. The block size thus determined is delivered to variable block shift quantity determination circuits 107, 108, 109 and first block floating circuits 120, 121, 122. The alteration of the block size may be controlled independently for every respective bands of the band division filters 101, 102, or may be controlled in common. It is to be noted that information of the orthogonal transform block size is adapted to be outputted also from output terminal 133.

Turning back to FIG. 1, spectrum data or MDCT coefficient data on the frequency base obtained after having undergone MDCT processing at respective MDCT circuits 123, 124, 125 undergo block floating at second block floating circuits 129 every respective critical bands, or every plural bands obtained by further dividing the critical band in a higher frequency band, thus to realize effective use of bits. Also at this time, while the floating width may be also 6 dB step, the number of samples within the block of the second block floating may be caused to be smaller than the number of samples within the block of the first block floating, thereby making it possible to carry out block floating at a step finer than 6 dB in order to allow the gain of the block floating to be large, and to allow the gain of the efficient coding to be large. In this embodiment, block floating with about 1.8 dB being as a unit is carried out. Further, first and second floating quantities are not separately delivered to a decoding apparatus which will be described later, but the sum total of these block floating quantities is calculated at a block floating sum total quantity calculation circuit 128, and the sum total block floating quantity thus calculated is sent out from output terminal 132.

Respective signals which have been subjected to block floating every so called critical bands or every plural bands obtained by further dividing the critical band in a higher frequency band are sent to an adaptive bit allocation coding circuit 130. This critical band is a frequency band divided in consideration of the hearing sense characteristic of the human being, i.e., a band that a narrow band noise has when a pure sound is masked by that noise having the same intensity as that of the pure sound in the vicinity of a frequency thereof. In this critical band, according as the frequency shifts to a higher frequency band side, the band width becomes broader, and the entire frequency band of 0~20 kHz is divided into, e.g., 25 critical bands.

An allowed noise calculation circuit 127 calculates allowed noise quantities every respective critical bands in which the so called masking effect is taken into consideration on the basis of spectrum data divided every critical bands to calculate the number of bits allocated every respective critical bands or every plural bands obtained by further dividing the critical band in a higher frequency band on the basis of those allowed noise quantities and energies or peak values, etc. of plural bands obtained by further dividing the critical band. Further, the adaptive bit allocation coding circuit 130 requantizes respective spectrum data (or MDCT coefficient data) in dependency upon the allocated bit number every respective critical bands or every plural bands obtained by further dividing the critical band in a higher frequency band. Data coded in this way is taken out through output terminal 131.

Figure 5:
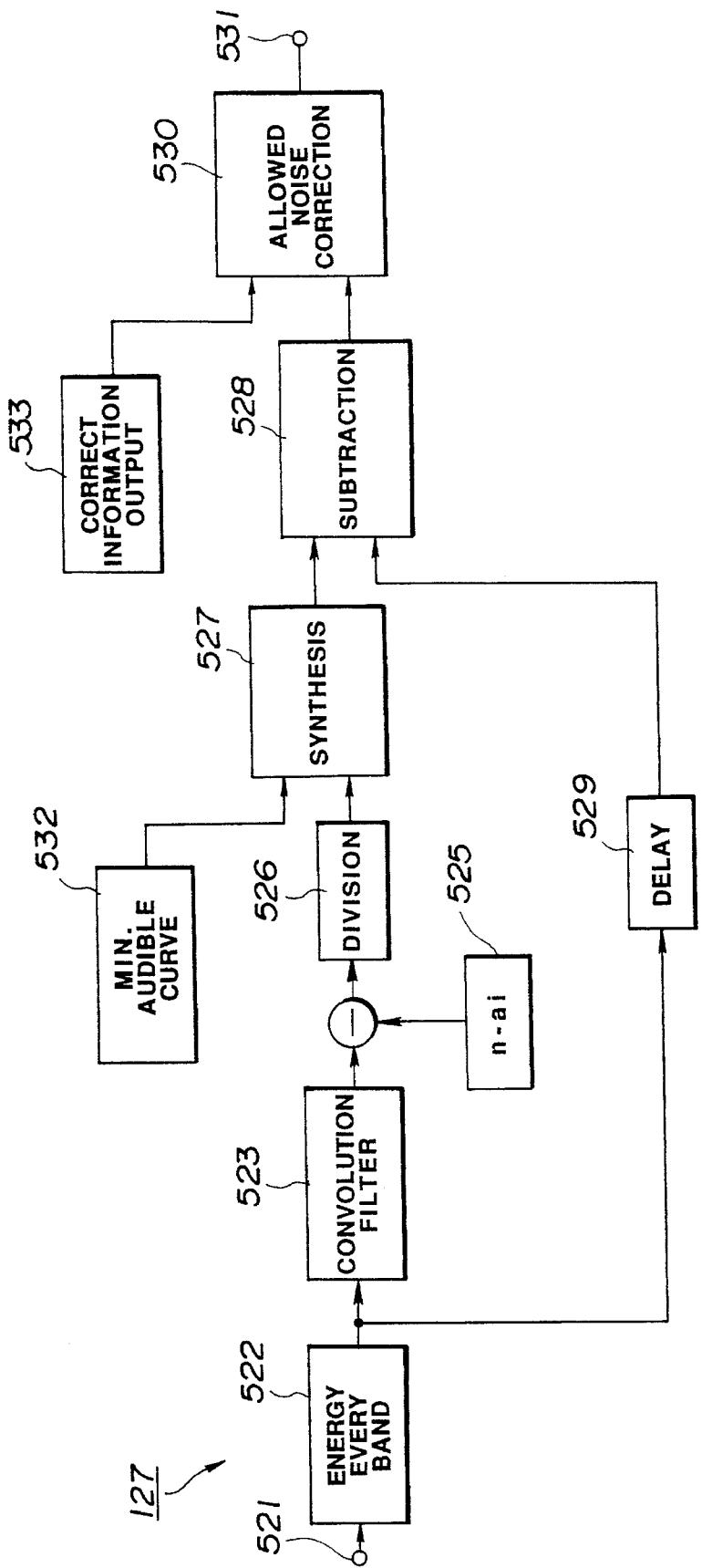
FIG. 5 is a circuit diagram showing, in a block form, an actual example of allowed noise calculation circuit 127 of the apparatus shown in FIG. 1.

The allowed noise calculation circuit 127 will now be described in more detail. MDCT coefficients obtained at MDCT circuits 123, 124, 125 are obtained from signals subjected to block floating at the block floating circuits 120–122. In this case, since an allowed noise to be calculated in the allowed noise calculation circuit 127 must be based on original signals, it is not preferable to calculate an allowed noise on the basis of the above-mentioned signals which have been subjected to block floating. For this reason, block floating at the block floating circuits 120~122 are first released at a block floating release circuit 126. Thus, the allowed noise calculation circuit 127 calculates an allowed noise by using block shift quantities obtained from variable block shift quantity determination circuits 107, 108, 109. FIG. 5 is a circuit diagram showing, in a block form, the outline of the configuration of an actual example of the above-mentioned allowed noise calculation circuit 127. In FIG. 5, input terminal 521 is supplied with spectrum data on the frequency base from the block floating release circuit 126.

Figure 6:
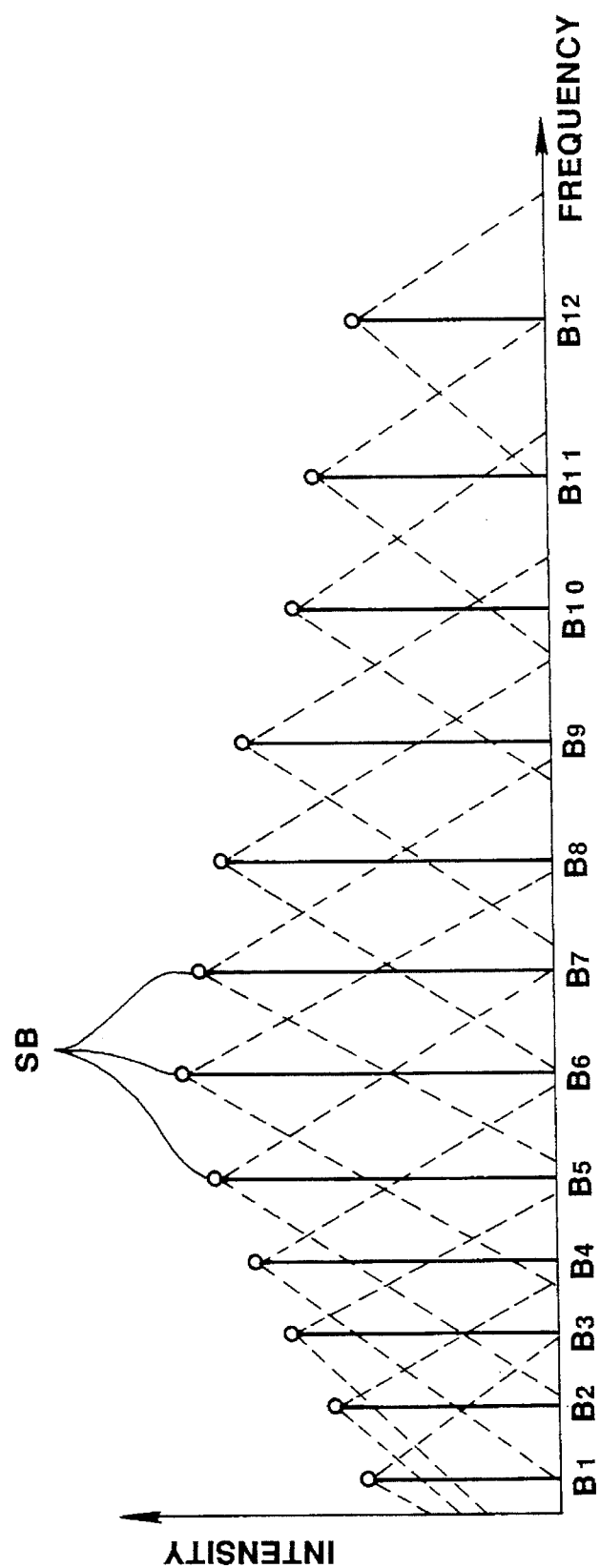
FIG. 6 is a view showing a bark spectrum.

The input data on the frequency base is sent to a circuit 522 for calculating energies every bands, at which energies every critical bands are calculated, e.g., by using a method of calculating a sum total of respective amplitude values within the critical band, or other methods. In place of energies every respective bands, peak values or mean values, etc. of amplitude values may be used. A spectrum of a sum total value of respective bands, for example, obtained as an output from the energy calculation circuit 522 is generally called a bark spectrum. FIG. 6 shows bark spectrum (components) SB for every respective critical bands. It is to be noted that the number of bands of the critical bands is represented with 12 bands (B1~B12) for the brevity of illustration.

Here, in order to allow for the influence in so called masking of the bark spectrum (components) SB, such a convolution processing to multiply the bark spectrum (components) SB by a predetermined weighting function to add multiplied values is implemented. To realize this, outputs of the circuit 522 for calculating energies every bands, i.e., respective values of the bark spectrum (components) SB are sent to a convolution filter circuit 523. This convolution filter circuit 523 is comprised of, e.g., a plurality of delay elements for sequentially delaying input data, a plurality of multipliers (e.g., 25 multipliers corresponding to respective bands) for multiplying outputs from these delay elements by filter coefficients (weighting function), and a sum total adder for taking a sum total of respective multiplier outputs. By this convolution processing, the sum total of portions indicated by dotted lines in FIG. 6 is taken.

It is to be noted that the above-mentioned masking is the phenomenon that a signal is masked by any other signal by the characteristic from a viewpoint of the hearing sense of the human being so that the masked signal is not heard. For this masking effect, there are a time base masking effect by an audio signal on the time base and the same time masking effect by a signal on the frequency base. By such masking effect, even if there is any noise at the portion subjected to masking, this noise is not to be heard. For this reason, in an actual audio signal, a noise within the range subjected to masking is caused to be allowable noise.

Here, an actual example of multiplication coefficients (filter coefficients) of respective multipliers of the convolution filter circuit 523 is shown below. When the coefficient of a multiplier M corresponding to an arbitrary band is assumed to be 1, a coefficient of 0.15 is multiplied by outputs of respective delay elements at a multiplier M-1; a coefficient of 0.0019 is multiplied by those outputs at a multiplier M-2; a coefficient of 0.0000086 is multiplied by those outputs at a multiplier M-3; a coefficient of 0.4 is multiplied by those outputs at a multiplier M+1; a coefficient of 0.06 is multiplied by those outputs at a multiplier M+2;

and a coefficient of 0.007 is multiplied by those outputs at a multiplier M+3. Thus, convolution processing of the bark spectrum SB is carried out. It is to be noted that M is an arbitrary integer of 1~25.

Then, an output of the convolution filter circuit 523 is sent to a subtracter 524. This subtracter 524 serves to calculate a level a corresponding to an allowable noise level (which will be described later) in the above-mentioned convoluted region. It is to be noted that the level $\alpha$ corresponding to the allowable noise level (allowed noise level) is such a level to become equal to an allowed noise level every critical band by carrying out inverse convolution processing as described later. This subtracter 524 is supplied with an allowed function for calculating the above-mentioned level $\alpha$ (function representing a masking level). By increasing or decreasing the value that the allowed function takes, control of the level $\alpha$ is carried out. This allowed function is supplied from an (n −ai) function generator 525 as described below.

Namely, when the number given in order from a lower frequency band side of the critical band is assumed as i, the level $\alpha$ corresponding to the allowed level can be calculated by the following formula (A):

$$\alpha = S - (n - ai) \quad (A)$$

In the formula (A), n and a are a constant (a>0), and S is the intensity of a convolution processed bark spectrum. In the formula (A), (n−ai) is the term indicating the allowed function. In this embodiment, n is set to 38 and a is set to 1. At this time, there is no degradation in the sound quality. Thus, satisfactory coding could be carried out.

In this way, the above-mentioned level $\alpha$ is determined. This data is transmitted to a divider 526. This divider 526 serves to implement inverse convolution to the level $\alpha$ in the above-mentioned convoluted region. Accordingly, by carrying out the inverse convolution processing, a masking threshold is obtained from the level $\alpha$. Namely, this masking threshold becomes an allowed noise spectrum. It is to be noted that while the above-mentioned inverse convolution processing requires complicated operation, the inverse convolution is carried out by using simplified divider 526 in this embodiment.

Figure 7:
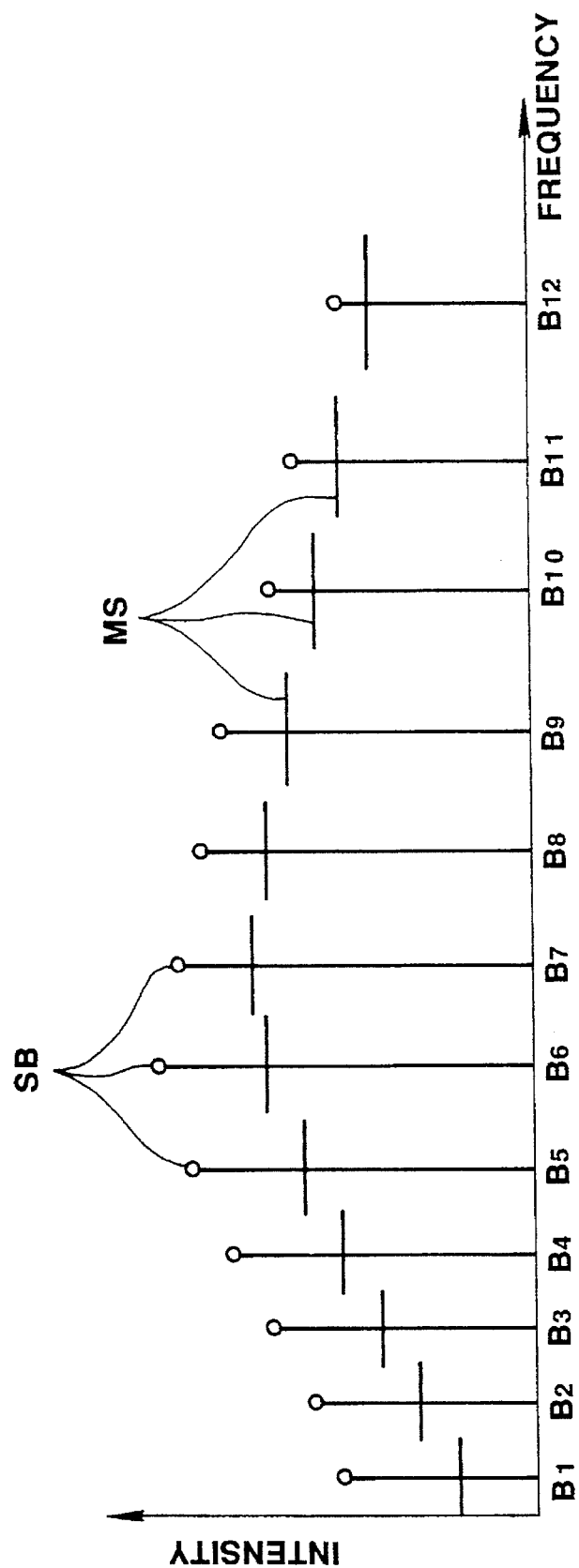
FIG. 7 is a view showing a masking spectrum.

The masking threshold is transmitted to a subtracter 528 through a synthesis circuit 527. This subtracter 528 is supplied with an output from the circuit 522 for detecting energies for every band, i.e., the previously described bark spectrum SB through a delay circuit 529. Accordingly, subtractive operation between the masking threshold and the bark spectrum (components) SB is carried out at the subtracter 528. Thus, as shown in FIG. 7, the level less than the level indicated by the masking threshold MS of the bark spectrum SB is masked.

An output from the subtracter 528 is taken out through an allowed noise correction circuit 530 and through an output terminal 531, and is sent to a ROM (not shown), etc. in which, e.g., allocated bit number information is stored in advance. The ROM, etc. outputs allocated bit number information every respective bands in dependency upon an output (the level of a difference between energies every respective bands and an output of a noise level setting means (not shown)) obtained through the allowed noise correction circuit 530 from the subtracter 528. This allocated bit number information is sent to the adaptive bit allocation coding circuit 130. As a result, respective spectrum data on the frequency base from the MDCT circuits 123, 124, 125 are quantized by the number of bits allocated for every respective band.

In short, the adaptive bit allocation coding circuit 130 quantizes spectrum data for every respective band by the number of bits allocated in dependency upon the level of a difference between energies or peak values every critical bands or every plural bands obtained by further dividing the critical band in a higher frequency band and an output of the noise level setting means. It is to be noted that the delay circuit 529 is provided for delaying the bark spectrum SB from the energy detecting circuit 522 by taking into consideration quantities of delays at respective circuits succeeding to the synthesis circuit 527.

Figure 8:
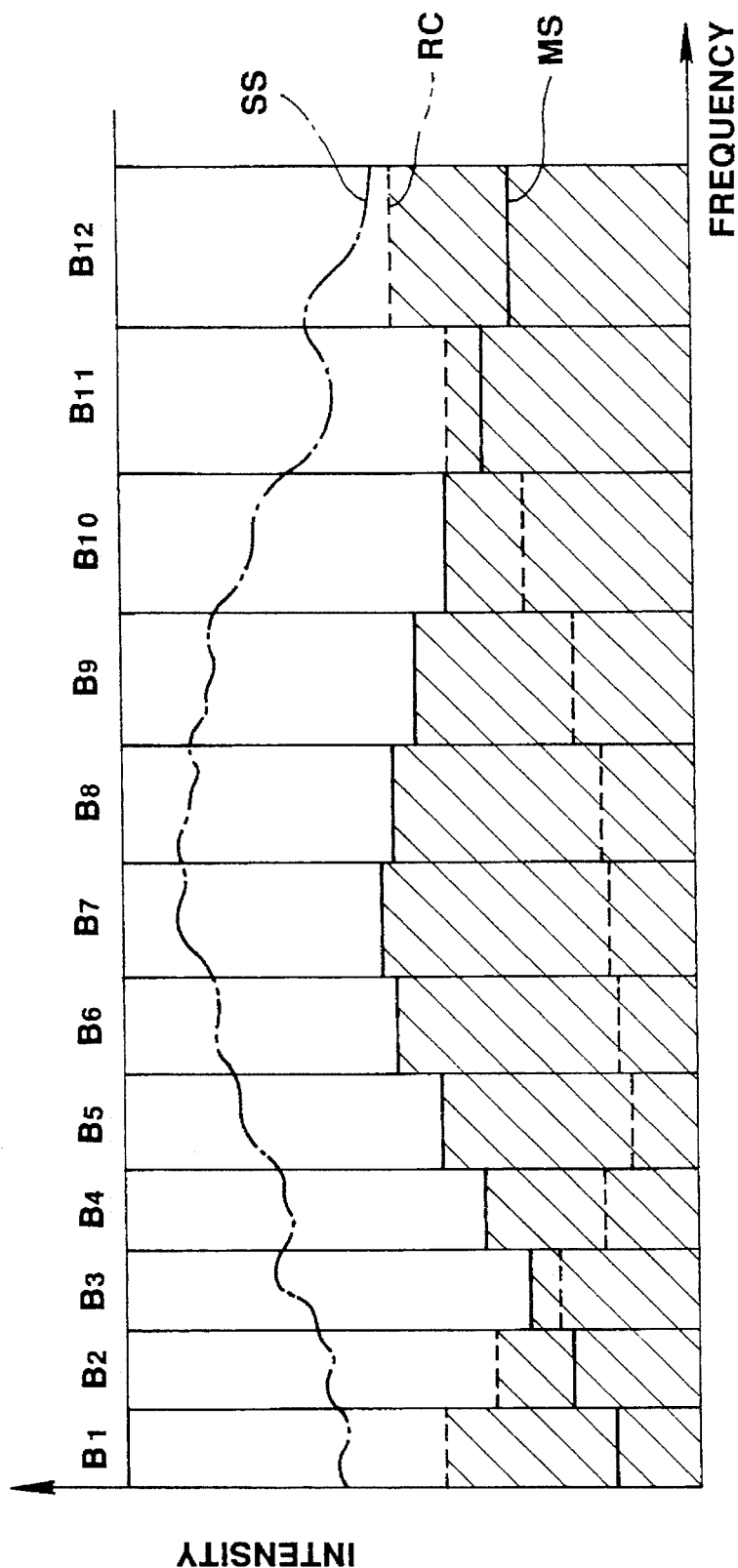
FIG. 8 is a view obtained by synthesizing a minimum audible curve and a masking spectrum.

Meanwhile, in synthesis at the above-described synthesis circuit 527, it is possible to synthesize data indicating so called minimum audible curve RC which is the hearing sense characteristic of the human being as shown in FIG. 8 delivered from a minimum audible curve generator 532 and the above-mentioned masking threshold NS. In this minimum audible curve, when the noise absolute level is less than the minimum audible curve, this noise cannot be heard. This minimum audible curve varies, e.g., depending upon the difference of a reproducing volume at the time of reproduction even if coding is the same. However, in a realistic digital system, there is not great difference in entering of music into, e.g., the 16 bit dynamic range. Accordingly, if quantization noise in a frequency band easiest to be heard in the vicinity of 4 kHz, for example, it is considered that quantization noise less than the level of the minimum audible curve cannot be heard in other frequency bands.

Accordingly, on the assumption that a way of use is employed such that, e.g., noise in the vicinity of 4 kHz of a word length that the system has is not heard, when the minimum audible curve RC and the masking threshold MS are synthesized to provide an allowed noise level, the allowed noise level in this case can be down to the portion indicated by slanting lines in FIG. 8. It is to be noted that, in this embodiment, the level of 4 kHz of the minimum audible curve is caused to be in correspondence with the minimum level corresponding to, e.g., 20 bits. Additionally, a signal spectrum SS is shown together in FIG. 8.

Further, the allowed noise correction circuit 530 corrects an allowed noise level in an output from the subtracter 528 on the basis of, e.g., equi-loudness curve sent from a correction information output circuit 533. Here, the equi-loudness curve is a characteristic curve relating to the hearing sense characteristic of the human being. For example, sound pressures of a sound at respective frequencies, which is heard at the same intensity as that of a pure sound of 1 kHz, for example, are determined to connect them by curves. This equi-loudness curve is also called an equi-sensitivity curve of loudness. Further, in this equi-loudness curve, substantially the same curve as the minimum audible curve RC shown in FIG. 8 is depicted. In the equi-loudness curve, for example, in the vicinity of 4 kHz, even if a sound pressure is lowered by 8~10 dB than that at 1 kHz, sound is heard at the same intensity as that at 1 kHz. In contrast, in the vicinity of 50 kHz, unless a sound pressure is higher by about 15 dB than that at 1 kHz, sound is not heard at the same intensity.

For this reason, it is seen that it is desirable that the noise above the level of the minimum audible curve (allowed noise level) is caused to have a frequency characteristic given by the curve corresponding to the equi-loudness curve. From facts as described above, it is seen that correcting the allowed noise level in consideration of the equi-loudness curve is in conformity with the hearing sense characteristic of the human being.

Here, the correction information output circuit 533 may be constructed to correct the allowed noise level on the basis of information of a difference between a detected output of an output information quantity (data quantity) in quantization at the coding circuit 130 and a bit rate target value of the finally coded data. The reason why such circuit configuration is employed is as follows. Namely, there are instances where the total number of bits obtained by implementing in advance temporary adaptive bit allocation to all bit allocation unit blocks may have an error with respect to a fixed number of bits (target value) determined by the bit rate of the finally coded output data. Therefore, bit allocation is carried out for a second time in order to allow the error to become equal to zero. Namely, bit allocation is carried out such that when the total number of allocated bits is less than the target value, the number of bits indicating a difference therebetween is allocated (assigned) to respective unit blocks to add it thereto, while when the total number of allocated bits is greater than the target value, the number of bits indicating a difference therebetween is allocated (assigned) to respective unit blocks to reduce it therefrom.

In order to carry out such an operation, an error from the target value of the total number of allocated bits is detected. In accordance with the error data, correction information output circuit 533 outputs correction data for correcting respective allocated bit numbers. Here, in the case where the error data indicates shortage of the number of bits, a greater number of bits are used per unit block. Namely, consideration can be made in connection with the case where the quantity of data is greater than the target value. In contrast, in the case where the error data is data indicating remainder of the number of bits, a lesser number of bits can be used per unit block. Namely, consideration can be made in connection with the case where the quantity of data is less than the target value.

Accordingly, from the correction information output circuit 533, data of the correction value for correcting an allowed noise level in an output from the subtracter 528, e.g., on the basis of information data of the equi-loudness curve is outputted in accordance with the error data. A correction value as described above is transmitted to the allowed noise correction circuit 530. Thus, the allowed noise level from the subtracter 528 is corrected. Further, as another embodiment, the number of bits of the target value may be fixedly allocated to respective blocks from the beginning. At this time, a quantity of operations can be reduced to much degree. As a further embodiment, allocation of bits dependent upon the magnitudes of signals of respective blocks may be carried out. At this time, the noise energy can be minimized.

A digital signal decoding apparatus of an embodiment of this invention will now be described.

Figure 9:
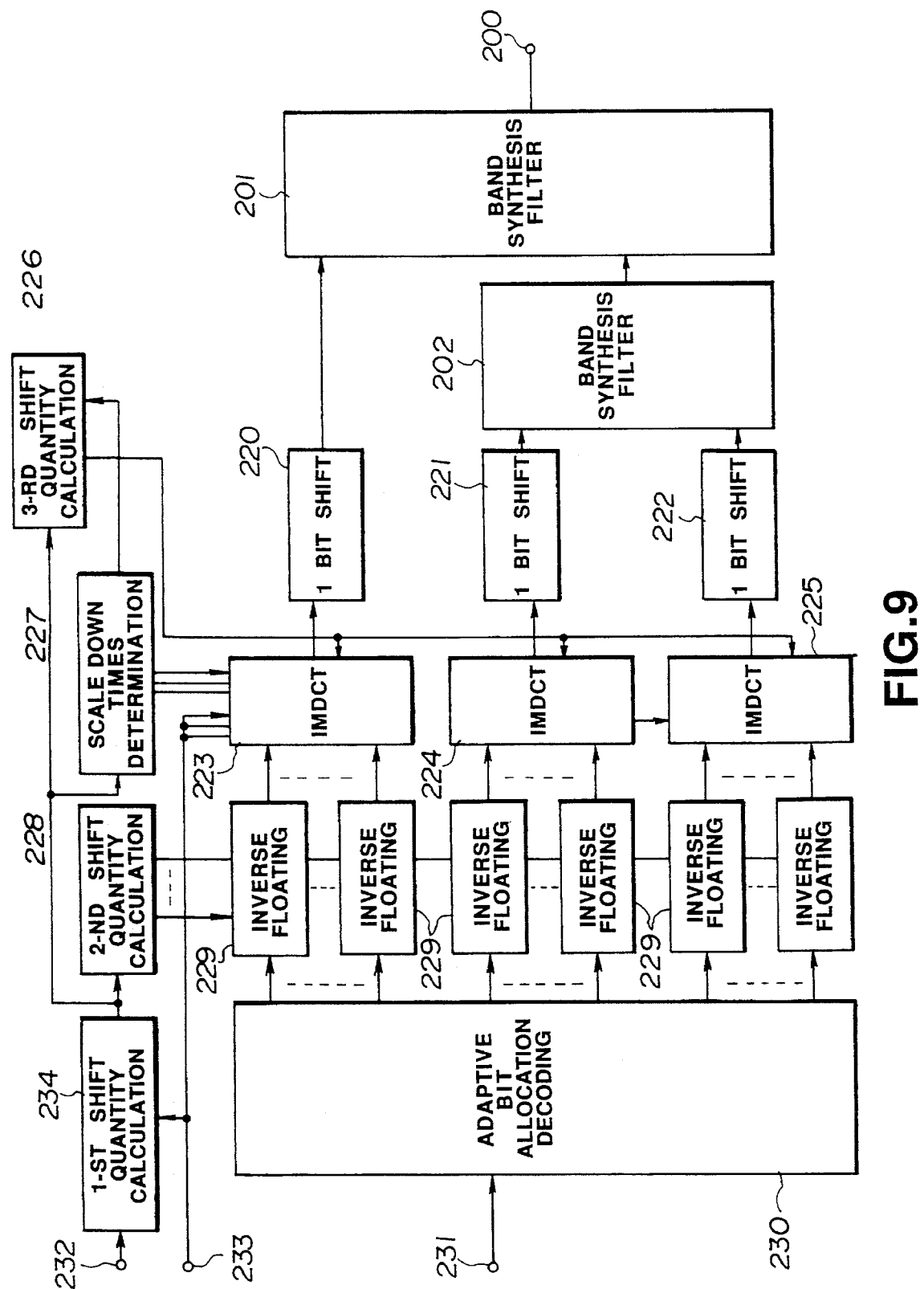
FIG. 9 is a circuit diagram showing, in a block form, a digital signal decoding apparatus which is an embodiment of this invention.

The digital signal decoding apparatus of this embodiment is directed to a digital signal decoding apparatus adapted for decoding a coded signal from an efficient coding apparatus (digital signal coding apparatus), which is, as described with reference to FIG. 1, adapted to divide an input digital signal into signals in respective frequency bands by using at least one filter to divide filter outputs into blocks every plural words to carry out a first block floating processing every respective blocks to further implement an orthogonal transform processing to the signal which has been subjected to the first block floating processing to thereby conduct frequency analysis to divide, every plural words, the orthogonally transformed output into blocks to carry out a second block floating processing and a quantization processing every respective blocks, characterized in that, as shown in FIG. 9, after the second block floating is released by inverse floating circuits 229, an inverse orthogonal processing is implemented to the coded signal at IMDC circuits 223, 224, 225 to thereby conduct frequency synthesis to restore it to a signal on the time base, and the first block floating is released in the process of the inverse orthogonal transform operation.

In the decoding apparatus of this embodiment, scale down is repeatedly carried out in the process of the inverse orthogonal transform operation to thereby release the first block floating. At this time, scale down in the process of the inverse orthogonal transform operation is variably carried out, and the number of scale down operations in the process of the inverse orthogonal transform operation is determined on the basis of the first block floating quantity. By reasonably implementing scale down in the process of the inverse orthogonal transform operation in this way, an overflow in the process of operation is prevented.

It is to be noted that, in the coding apparatus corresponding to the digital signal decoding apparatus of this embodiment, as described above, a band division by filter is carried out such that according as the frequency shifts to a lower frequency band, the band width is caused to be broad. This band division by filter is realized by cascade-connecting filters for dividing the frequency band into two frequency bands (band division filters 101, 102 of FIG. 1).

Further, in the digital signal decoding apparatus of this embodiment, the above-mentioned inverse orthogonal transform processing is caused to be Inverse Modified Discrete Cosine Transform (IMDCT), and the inverse orthogonal transform processing is carried out at a variable block size.

Namely, in FIG. 9, an input terminal 231 is supplied with coded data on the frequency base obtained from the output terminal 131 of FIG. 1. This coded data is first sent to an adaptive bit allocation decoding circuit 230, at which it is subjected to decoding processing. Then, the decoded data thus obtained are sent to inverse floating circuits 229 for releasing the second block floating. These inverse floating circuits 229 process such decoded data at every critical band or at every plural bands obtained by further dividing the critical band in a higher frequency band. The shift quantity of the second block floating used at this time is calculated as follows.

A floating quantity from the above-described coding apparatus is first delivered to a terminal 232. A first shift quantity calculation circuit 234 for calculating the first block floating quantity calculates, every orthogonal transform block, a minimum bit shift quantity of floating quantities included therein to thereby calculate the first block floating quantity. The first block floating quantity thus obtained is a value with 6 dB (1 bit) being as a unit.

A second shift quantity calculation circuit 228 for calculating a second block floating quantity subtracts the first block floating quantity which has been calculated at the first shift quantity calculation circuit 234 from a floating quantity from the coding apparatus, which has been delivered to the terminal 232, every critical bands or every plural bands obtained by further dividing the critical band in a higher frequency band to thereby calculate the second block floating quantity.

Further, an input terminal 233 is supplied with block size data from the coding apparatus. This block size data is delivered to the first shift quantity calculation circuit 234 and IMDCT circuits 223, 224, 225 which serve as an inverse orthogonal transform circuit.

Further, a scale down times determination circuit 227 determines the number of scale down times at the IMDCT circuits 223, 224, 225 from an output of the first shift quantity calculation circuit 234. Then a third shift quantity calculation circuit 226 calculates a third shift quantity from the first shift quantity and the scale down times to deliver it to the IMDCT circuits 223, 224, 225. It is to be noted that the above-mentioned third shift quantity is a shift quantity for allowing outputs of the IMDCT circuits 223, 224, 225 to be uniformly equal to one half of the normal scale, i.e., a value shifted by one bit to the LSB side.

Words where the second block floating is released by the inverse floating circuits 229 by using the second block floating quantity from the second shift quantity calculation circuit 228 undergoes a processing such that the orthogonal transform operation is released at the respective IMDCT circuits 223, 224, 225. At the same time, in the process of operations of IMDCT at these IMDCT circuits 223, 224, 225, scale down is implemented by an output of the scale down times determination circuit 227. Further, scaled down inverse orthogonally transformed outputs are shifted by the third shift quantity, and are then outputted in the state scale down to ½, i.e., shifted by one bit to the LSB side.

An actual operation at the scale down determination circuit 227, the third shift quantity calculation circuit 226, and the IMDCT circuits 223, 224, 225 will now be described in detail by using an example of the IMDCT calculation technique. The calculation formula of IMDCT is given by the following formula (1). Calculation of IMDCT can be carried out at a high speed by using, e.g., FFT (First Fourier Transform). The calculation procedure is shown below:

$$y(n) = \sum_{n=0}^{M-1} x_1(k)\cos(\pi(2k+1)(2n+M+1)/4M), \quad (1)$$

$$0 \leq n < 2M$$

First, U(k) is defined by the following formula (2):

$$U(k) = X(2k), 0 \leq k < M/2 \quad (2)$$
$$= -X(2M-1-2k), M/2 \leq k < M$$

From the above formula (2), complex series Z(l) is calculated by transform operation expressed by the following formula (3):

$$Z(l)=(U(2l)+iU(2l+1))exp(-i2\pi l/M), 0\leq<M/2 \quad (3)$$

In actual terms, a calculation to develop the complex number into the real number is carried out as indicated by the following formula (4):

$$Re[Z(l)]=U(2l) \cos (-2\pi l/M)-U(2l+1) \sin (-2\pi l/M) \; Im[Z(l)]=U(2l+1) \cos (-2\pi l/M)+U(2l) \sin (-2\pi l/M) 0\leq l<M/2 \quad (4)$$

Here, FFT is implemented to z(l) as indicated by the following formula (5) to thereby provide z(n):

$$z(n) = \sum_{l=0}^{M/2-1} Z(l)exp(-i2\pi nl/(M/2)), \quad (5)$$

$$0 \leq n < M/2$$

In the operation of FFT, e.g., Cooley-Tukey algorithm generally well known is used to implement N stages ((n-th power of 2)=M/2) of the butterfly operation to Z(l).

A transform operation indicated by the following formula (6) is implemented to the output z(n) of FFT, thereby making it possible to provide u(n).

$$u(n) = a_{0,n}Re[z(n)] + a_{1,n}Re[z(M/2-1-n)] + \quad (6)$$
$$\quad a_{2,n}Im[z(n)] + a_{3,n}Im[z(M/2-1-n)]$$

$$u(M-1-n) = a_{2,n}Re[z(n)] - a_{3,n}Re[z(M/2-1-n)] -$$
$$\quad a_{0,n}Im[z(n)] + a_{1,n}Im[z(M/2-1-n)]$$

$$0 \leq n < M/2$$

In this formula (6), conditioning indicated by the following formula (7) is implemented:

$$a_{0,k}=(\frac{1}{2})(\cos(\pi(2k+1)/4\ MD - \sin(5\pi(2k+1)/4M)\ a_{1,k}=(\frac{1}{2})(\cos(\pi(2k+1)/4\ MD + \sin(5\pi(2k+1)/4\ MD\ a_{2,k}=(\frac{1}{2})(\sin(\pi(2k+1)/4\ MD + \cos(5\pi(2k+1)/4\ MD\ a_{3,k}=(\frac{1}{2})(-\sin(\pi(2k+1)/4\ MD + \cos(5\pi(2k+1)/4\ MD \quad (7)$$

Then, u(n) is subjected to sequencing as shown below to expand it to the length 2M to thereby obtain y(n) as indicated by the following formula (8):

$$\begin{aligned} y(n) &= u(n+M/2), 0 \leq n < M/2 \quad (8) \\ &= -u(3M/2-1-n), M/2 \leq n < 3M/2 \\ &= -u(n-3M/2), 3M/2 \leq n < 2M \end{aligned}$$

The calculation procedure of IMDCT has been described above.

The relationship between the number of scale down times determined by the scale down times determination circuit 227 and the IMDCT operation will now be described. In the IMDCT circuits of FIG. 9, in order to prevent an overflow in the process of operation described in connection with the drawbacks of the prior art, the operation accuracy of the IMDCT is scaled down. At this time, if the operation accuracy is excessively lowered, a sound obtained is offensive to the ear. For this reason, scale down is gradually carried out. Accordingly, scale down is repeatedly carried out to such a degree that a subsequent sound is not offensive to the ear, and to such a degree that no overflow takes place. In dependency upon the number of scale down times, the above-mentioned formulas (4), (5) and (6) are selectively applied in actual terms. In the case of the formulas (4), (6), respective one scale down operations are carried out. On the other hand, in the case of the formula (5), N times of scale down operations are carried out because this formula is applied to respective stages of the butterfly operation. Of course, this scale down is variable, and therefore varies in dependency upon a first shift quantity. Accordingly, the maximum number of times for implementing the scale down operations (maximum scale down times) is determined by the number of stages of the butterfly operation, i.e., the block length M for carrying out IMDCT. When the maximum number of scale down times is now assumed to be MSD, this maximum number of scale down times MSD can be expressed by the following formula (9). It is to be noted that N in the formula (9) indicates the number of stages of the butterfly operation.

$$\begin{aligned} MSD &= 1+N+1 \quad (9) \\ &= N+2 \end{aligned}$$

Here, in the case where, e.g., M is 128, the number of stages N of the butterfly operation is 6. For this reason, the maximum scale down times MSD is 8 from the above-mentioned formula (9). Therefore, there is no possibility that the number of times of scale down operations determined by the scale down times determination circuit 227 is above 8.

Further, when it is assumed that an output of the first shift quantity calculation circuit 234 is IBF1 (first shift quantity IBF1), that the number of scale down operations is ISD, and that the maximum number of scale down operations is MSD, the number of scale down times can be expressed by the following formula (10):

$$ISD=1\ (IBF1<0)\ ISD=IBF1+1\ (0\leq IBF1<MSD)\ ISD=MSD\ (IBF1\geq MSD) \quad (10)$$

Here, when the first shift quantity IBF1 is a positive number, it indicates a shift quantity to the MSB side. In contrast, when the first shift quantity IBF1 is a negative number, it indicates a shift quantity to the LSB side in terms of the absolute value. Further, when the number of scale down operations is 1, scale down is implemented by a quantity indicated by the above-mentioned formula (4). Every time the value of the number of scale down operations ISD is increased by 1, scale down is implemented in order of the first stage of the formula (5) and the second stage thereof.

The third shift quantity calculation circuit 226 will now be described. This third shift quantity is a shift quantity for allowing the scale at the time of an output of the formula (8) in the IMDCT calculation procedure to be uniformly adjusted, and is a shift quantity for allowing the scale at the time of output of the formula (8) to be equal to a value which is one half of the normal scale, i.e., for allowing it to be placed in the state shifted by one bit to the LSB side. This third shift quantity will be referred to as IBF3. When the third shift quantity IBF3 is a positive number, it indicates a shift quantity to the LSB side. In contrast, when the third shift quantity IBF3 is a negative number, ii indicates a shift quantity to the MSB side in terms of the absolute value. The reason why the output of the formula (8) is scaled down to ½ is to prevent an overflow, and a margin of one bit is given on the MSB side. Further, the relationship of the first shift quantity IBF1, the number of scale down operations ISD, and the third shift quantity IBF3 is irrelevant to the value of the first shift quantity IBF1, and can be expressed by the following formula (11):

$$IBF1-ISD-IBF3=-1 \quad (11)$$

In the above-mentioned formula (11), floating corresponding to the first shift quantity IBF1 is released by the number of scale down operations ISD and the third shift quantity IBF3. The scale of each word at the time of IMDCT output indicates uniformly −1, i.e., that it is in the state shifted by one bit to the LSB side.

Namely, the relationship of the first shift quantity IBF1, the number of scale down operations ISD and the third shift quantity IBF3 in the case where, e.g., the IMDCT block length M is 128 (the number of butterfly stages of FFT is 6) is as shown in Table 1. In this Table, asterisk (*) implies that scale down is implemented. From the Table 1, also in the case where the first shift quantity IBF1 takes other values than those indicated in this Table 1 (1A, 1B), the number of scale down times ISD and the third shift quantity IBF3 are determined in accordance with the above-mentioned rule.

TABLE 1

| IBF1 | −1 | 0 | 1 | 2 | 3 | 4 | 5 | 6 | 7 | 8 | 9 | 10 |
|---|---|---|---|---|---|---|---|---|---|---|---|---|
| ISD | 1 | 1 | 2 | 3 | 4 | 5 | 6 | 7 | 8 | 8 | 8 | 8 |
| FORMULA (4) | * | * | * | * | * | * | * | * | * | * | * | * |
| FORMULA (5) | | | | | | | | | | | | |
| 1-ST STAGE | | | * | * | * | * | * | * | * | * | * | * |

TABLE 1-continued

| | | | | | | | | | | | |
|---|---|---|---|---|---|---|---|---|---|---|---|
| 2-ND STAGE | | | * | * | * | * | * | * | * | * | * |
| 3-RD STAGE | | | | * | * | * | * | * | * | * | * |
| 4-TH STAGE | | | | | * | * | * | * | * | * | * |
| 5-TH STAGE | | | | | | * | * | * | * | * | * |
| 6-TH STAGE | | | | | | | * | * | * | * | * |
| FOR-MULA (6) | | | | | | | | | * | * | * | * |
| IBF3 | −1 | 0 | 0 | 0 | 0 | 0 | 0 | 0 | 1 | 2 | 3 |

Figure 10:
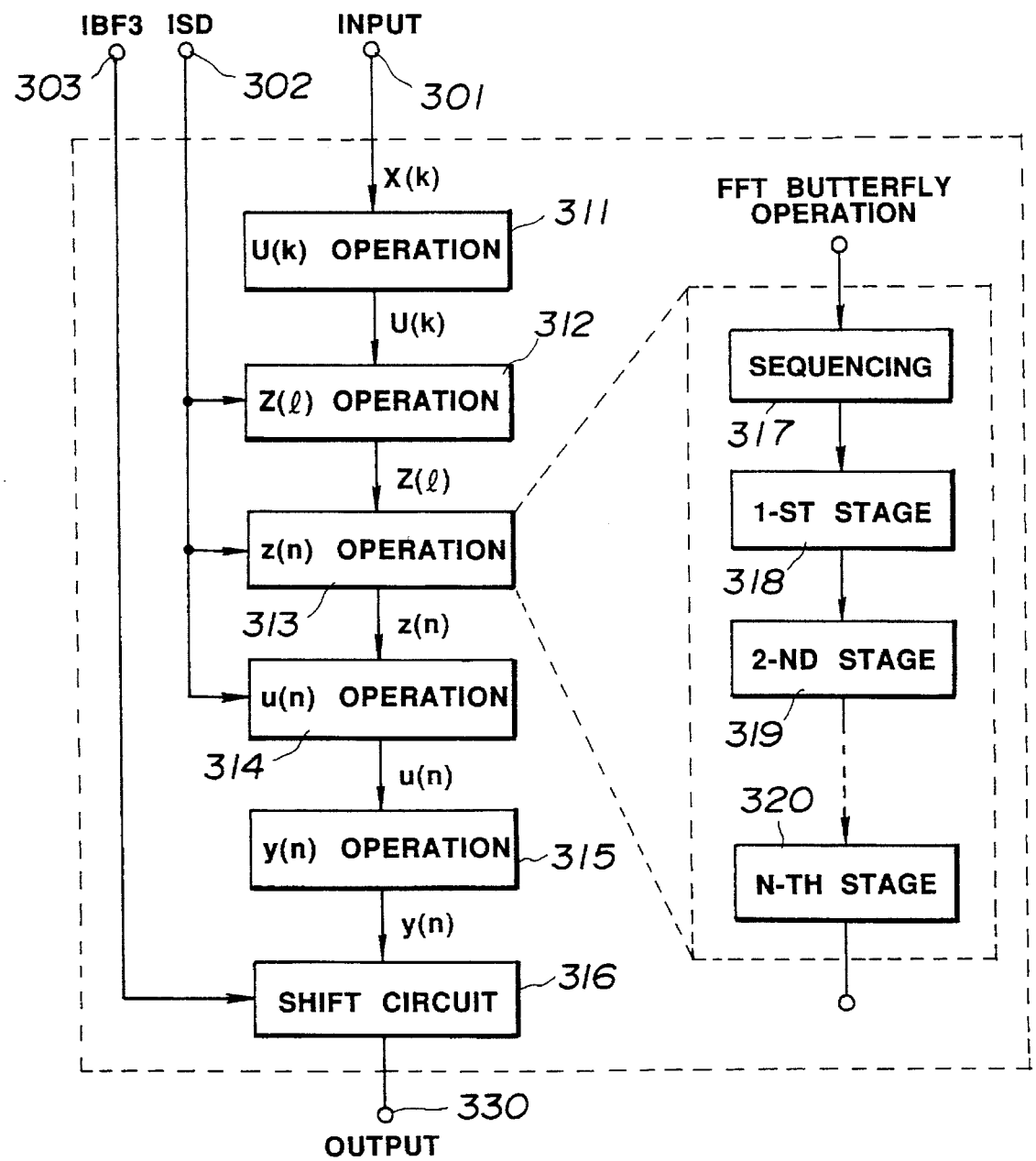
FIG. 10 is a circuit diagram showing, in a block form, the internal configuration of the IMDCT circuit shown in FIG. 9 in more detail.

The above-mentioned IMDCT circuits 223, 224, 225 will now be described by taking an example of a more practical configuration. FIG. 10 is a circuit diagram showing, in a block form, the internal configuration of the respective IMDCT circuits 223, 224, 225 in the case where an operation is performed on the basis of the calculation procedure of the IMDCT.

Namely, the circuit configuration of FIG. 10 comprises a terminal 301 supplied with data X(k) from the inverse floating circuit 229, a terminal 302 supplied with the number of scale down operations TSD from the scale down times determination circuit 227, a terminal 303 supplied with a third shift quantity IBF3 from the third shift quantity calculation circuit 226, a U(k) operation circuit 311 for calculating U(k) by the operation of the formula (2), a Z(l) operation circuit 312 for calculating Z(l) by the operation of the formula (3) or the formula (4), a z(n) operation circuit 313 for calculating z(n) by the operation of the formula (5), a u(n) operation circuit 314 for calculating u(n) by the operation of the formula (6), a y(n) operation circuit 315 for calculating y(n) by the operation of the formula (8), a shift circuit 316 for carrying out shift operation corresponding to the third shift quantity IBF3, and an output terminal 330. By these circuit components, operations are performed in succession in order of the formulas (2), (4), (5), (6), (8) in accordance with the above-described calculation procedure. Further, the Z(l) operation circuit 312, the z(n) operation circuit 313 and the u(n) operation circuit 314 are supplied with the number of scale down operations ISD, at which scale down is implemented on the basis of that value. In addition, the shift circuit 316 is supplied with a third shift quantity IBF3 through the terminal 303. At this shift circuit 316, all words of the output y(n) of the y(n) operation circuit 315 are shifted every respective words by the third shift quantity IBF3. Thereafter, an output of the shift circuit 316 is taken out from the terminal 330. The output thus obtained serves as outputs of the IMDCT circuits 223, 224, 225. Thus, a shift quantity corresponding to the first shift quantity IBF1, i.e., a floating quantity is completely released. It is to be noted that outputs of respective words at the IMDCT circuits 223, 224, 225 are outputted with the scale being reduced to one half, i.e., in the state shifted by one bit to the LSB side.

Here, the z(n) operation circuit 313 shown in FIG. 10 is constituted, for the purpose of implementing the N stages ((the N-th power of 2)=M/2) of the butterfly operation, with a sequencing circuit 317 for implementing sequencing to data of the output Z(l), and the first to N-th stages of operation circuits 318–320 for the butterfly operation. In this z(n) operation circuit 313, the value of the number of scale down operations ISD is applied as described above. This z(n) operation circuit 313 implements scale down on the basis of that value.

Further, all words at an output of the formula (8) are shifted on the basis of the third shift quantity IBF3. Thus, block floating having a shift quantity corresponding to the first shift quantity IBF1, i.e., a floating quantity is completely released. It is to be noted that outputs of respective words at the IMDCT circuits 223, 224, 225 are outputted with the scale being reduced to one half, i.e., in the state shifted by one bit to the LSB side.

Turning back to FIG. 9, outputs of the IMDCT circuits 223, 224, 225 are respectively sent to 1 bit shift circuits 220, 221, 222. At these circuits, words outputted at the scale of ½ are shifted by one bit to the MSB side so that its scale is caused to be in correspondence with a normal scale for a second time. Thus, there results the state where the first block floating is completely released.

Thereafter, outputs of 1 bit shift circuits 221, 222 are synthesized at a band synthesis filter 202, and an output of the 1 bit shift circuit 220 and an output of the band synthesis filter 202 and are synthesized at a band synthesis filter 201, resulting in a reproduced signal. The reproduced signal thus obtained is taken out from output terminal 200.

It is to be noted that this invention is not limited only to the above-mentioned embodiment, but may be applied not only to a signal processor for an audio PCM signal as described above but also to, e.g., a signal processor for digital speech signal, etc. In addition, this invention may be applied not only to the decoding apparatus of the above-mentioned embodiment but also similarly to other decoding apparatuses.

As described in detail, in accordance with the digital signal decoding apparatus according to this invention, block floating having a predetermined floating quantity of each word at the time of inputting to the inverse orthogonal transform circuit is released by repeatedly implementing scale down at the time of the inverse orthogonal transform operation processing thus to allow the scale in the inverse orthogonally transformed output to be in correspondence with a normal scale for a second time. Accordingly, it is possible to improve the operation accuracy at the time of the inverse orthogonal transform operation processing, and to prevent an overflow in the process of operation.

What is claimed is:

1. A method of decoding a coded digital signal, the coded digital signal generated by spectrally separating an input signal, plural word blocking the spectrally separated input signal, orthogonally transforming the blocked spectrally separated input signal and adaptive bit allocation coding the transformed blocked spectrally separated input signal, comprising the steps of:

adaptively decoding the coded digital signal into plural signals;

calculating a first block floating quantity from a floating quantity derived from the input signal;

calculating a second block floating quantity from the first block floating quantity;

releasing a second block floating of each of the plural signals based upon the second block floating quantity;

determining a number of scale down times based upon the first block floating quantity;

inverse orthogonally transforming and releasing a first block floating of the second block floating released plural signals based upon the scale down times and based upon block size data derived from the input signal; and bit shifting each of the inverse orthogonally transformed plural signals.

2. The method of claim 1, further comprising the step of:

combining the bit shifted orthogonally transformed plural signals to generate a synthesized signal.

3. The method of claim 2, wherein the step of combining is performed by at least one filter, further comprising the steps of:

broadening a frequency bandwidth in response to a shift of the input signal to a lower frequency band.

4. The method of claim 3, wherein the filters for combining are cascade-connected.

5. The method of claim 1, wherein the step of inverse orthogonally transforming further comprises the step of:

releasing the first block floating based upon repeated scale downs.

6. The method of claim 5, wherein the repeated scale downs are reversible.

7. The method of claim 6, wherein a number of scale down times is determined on the basis of the first block floating quantity.

8. The method of claim 5, wherein scale down is implemented in the step of inverse orthogonal transforming to thereby prevent overflow.

9. The method of claim 1, wherein said step of inverse orthogonal transforming is performed at a variable block size.

10. The method of claim 1, 2, 5, 6, 7 or 8, wherein the inverse orthogonal transforming is an inverse modified cosine transforming.

11. A method of decoding a coded digital signal, the coded digital signal generated by dividing into blocks every several words of an input signal, orthogonally transforming the blocks and adaptive bit allocation coding the orthogonally transformed blocks, comprising the steps of:

adaptively decoding the coded digital signal into plural signals;

calculating a first block floating quantity from a floating quantity derived from the input signal;

calculating a second block floating quantity from the first block floating quantity;

releasing a second block floating of each of the plural signals based upon the second block floating quantity;

determining a number of scale down times based upon the first block floating quantity;

inverse orthogonally transforming and releasing a first block floating of the second block floating released plural signals based upon the scale down times and based upon block size data derived from the input signal; and bit shifting each of the inverse orthogonally transformed plural signals.

12. The method of claim 11, further comprising the step of:

combining the bit shifted orthogonally transformed plural signals to generate a synthesized signal.

13. The method of claim 11, wherein the step of inverse orthogonally transforming further comprises the step of:

releasing the first block floating based upon repeated scale downs.

14. The method of claim 13, wherein the repeated scale downs are reversible.

15. The method of claim 14, wherein a number of scale down times is determined on the basis of the first block floating quantity.

16. The method of claim 13, wherein scale down is implemented in the step of inverse orthogonal transforming to thereby prevent overflow.

17. The method of claim 11, 12, 13, 14, 15 or 16, wherein the inverse orthogonal transforming is an inverse modified cosine transforming.

18. The method of claim 11, wherein said inverse orthogonal transforming is performed at a variable block size.

19. An apparatus for decoding a coded digital signal, the coded digital signal generated by spectrally separating an input signal, plural word blocking the spectrally separated input signal, orthogonally transforming the blocked spectrally separated input signal and adaptive bit allocation coding the orthogonally transformed blocked spectrally separated input signal, comprising:

means for adaptively decoding the coded digital signal into plural signals;

means for calculating a first block floating quantity from a floating quantity derived from the input signal;

means for calculating a second block floating quantity from the first block floating quantity;

means for releasing a second block floating of each of the plural signals based upon the second block floating quantity;

means for determining a number of scale down times based upon the first block floating quantity;

means for inverse orthogonally transforming and releasing a first block floating of the second block floating released plural signals based upon the scale down times and based upon block size data derived from the input signal; and means for bit shifting each of the inverse orthogonally transformed plural signals.

20. The apparatus of claim 19, further comprising:

means for combining the bit shifted orthogonally transformed plural signals to generate a synthesized signal.

21. The apparatus of claim 20, wherein the means for combining further comprises:

cascade-connected band synthesis filters.

22. The apparatus of claim 19, wherein the means for inverse orthogonally transforming further comprises:

means for releasing the first block floating based upon repeated scale downs.

23. The apparatus of claim 22, wherein the repeated scale downs are reversible.

24. The apparatus of claim 23, wherein the means for releasing further comprises:

means for determining a number of scale down times on the basis of the first block floating quantity.

25. The apparatus of claim 22, wherein scale down is implemented to thereby prevent overflow.

26. The apparatus of claim 19, wherein said means for inverse orthogonal transforming transforms at a variable block size.

27. The apparatus of claim 19, 20, 21, 22, 23, 24, or 25, wherein the means for inverse orthogonal transforming comprises:

an inverse modified cosine transformer.

28. An apparatus for decoding a coded digital signal, the coded digital signal generated by dividing into blocks every several words of an input signal, orthogonally transforming the blocks and adaptive bit allocation coding the orthogonally transformed blocks, comprising:

means for adaptively decoding the coded digital signal into plural signals;

means for calculating a first block floating quantity from a floating quantity derived from the input signal;

means for calculating a second block floating quantity from the first block floating quantity;

means for releasing a second block floating of each of the plural signals based upon the second block floating quantity;

means for determining a number of scale down times based upon the first block floating quantity;

means for inverse orthogonally transforming and releasing a first block floating of the second block floating released plural signals based upon the scale down times and based upon block size data derived from the input signal; and means for bit shifting each of the inverse orthogonally transformed plural signals.

29. The apparatus of claim 28, further comprising:

means for combining the bit shifted orthogonally transformed plural signals to generate a synthesized signal.

30. The apparatus of claim 29, wherein the means for combining further comprises:

cascade-connected band synthesis filters.

31. The apparatus of claim 28, wherein the means for inverse orthogonally transforming further comprises:

means for releasing the first block floating based upon repeated scale downs.

32. The apparatus of claim 31, wherein the repeated scale downs are reversible.

33. The apparatus of claim 32, wherein the means for releasing further comprises:

means for determining a number of scale down times on the basis of the first block floating quantity.

34. The apparatus of claim 31, wherein scale down is implemented to thereby prevent overflow.

35. The apparatus of claim 28, wherein said means for inverse orthogonal transforming transforms at a variable block size.

36. The apparatus of claim 28, 29, 30, 31, 32, 33 or 34, wherein the means for inverse orthogonal transforming comprises:

an inverse modified cosine transformer.

* * * * *